Nov. 13, 1956  G. R. STIBITZ  2,770,145
FUNCTION UNIT

Original Filed Feb. 12, 1948  10 Sheets-Sheet 1

INVENTOR
GEORGE R. STIBITZ
BY
ATTORNEYS

Nov. 13, 1956 G. R. STIBITZ 2,770,145
FUNCTION UNIT
Original Filed Feb. 12, 1948 10 Sheets-Sheet 2

INVENTOR
GEORGE R. STIBITZ
BY
ATTORNEYS

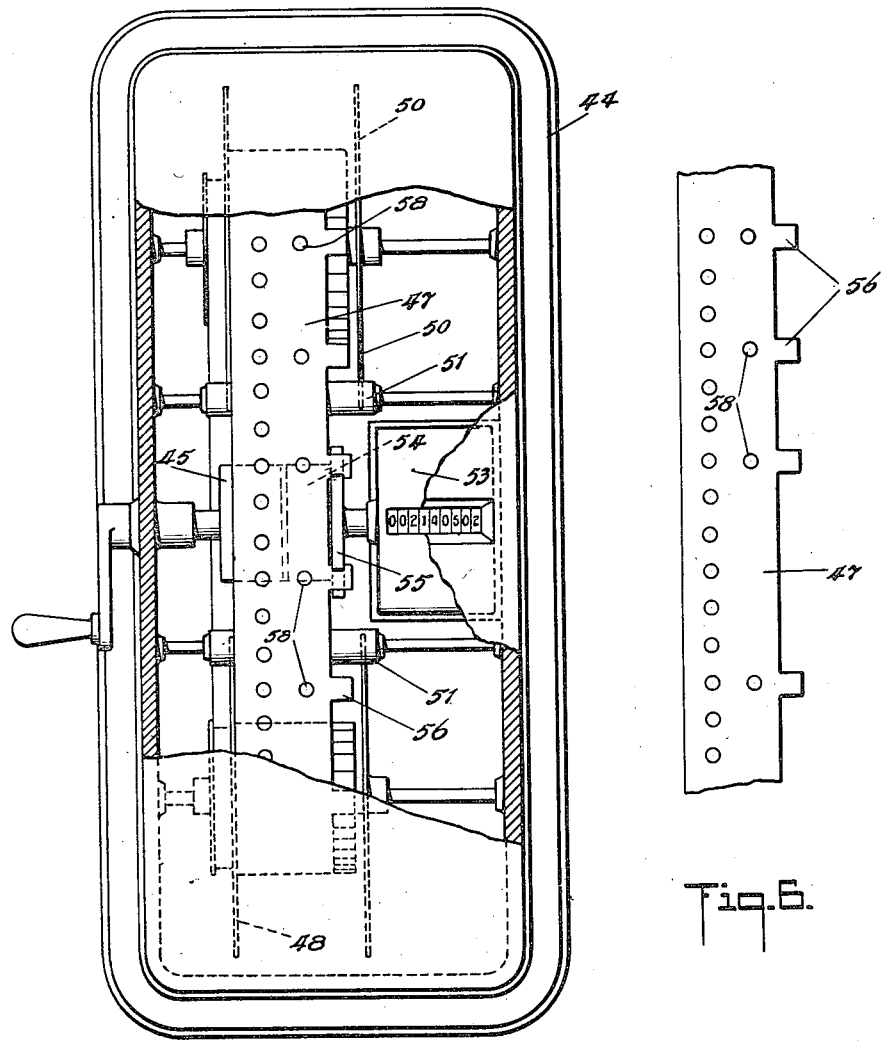

Nov. 13, 1956 G. R. STIBITZ 2,770,145
FUNCTION UNIT

Original Filed Feb. 12, 1948 10 Sheets-Sheet 4

INVENTOR
GEORGE R. STIBITZ
BY Darby & Darby
ATTORNEYS

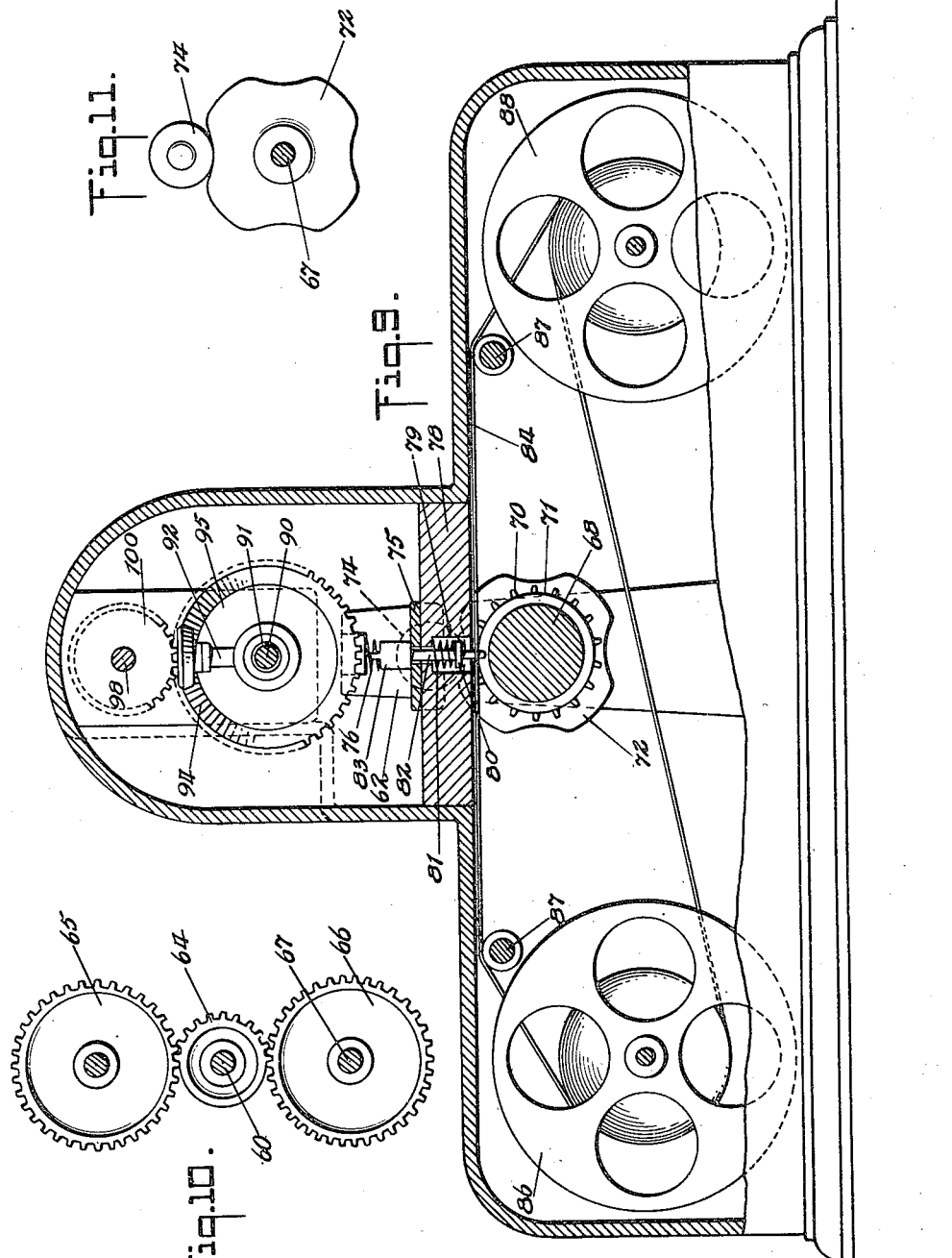

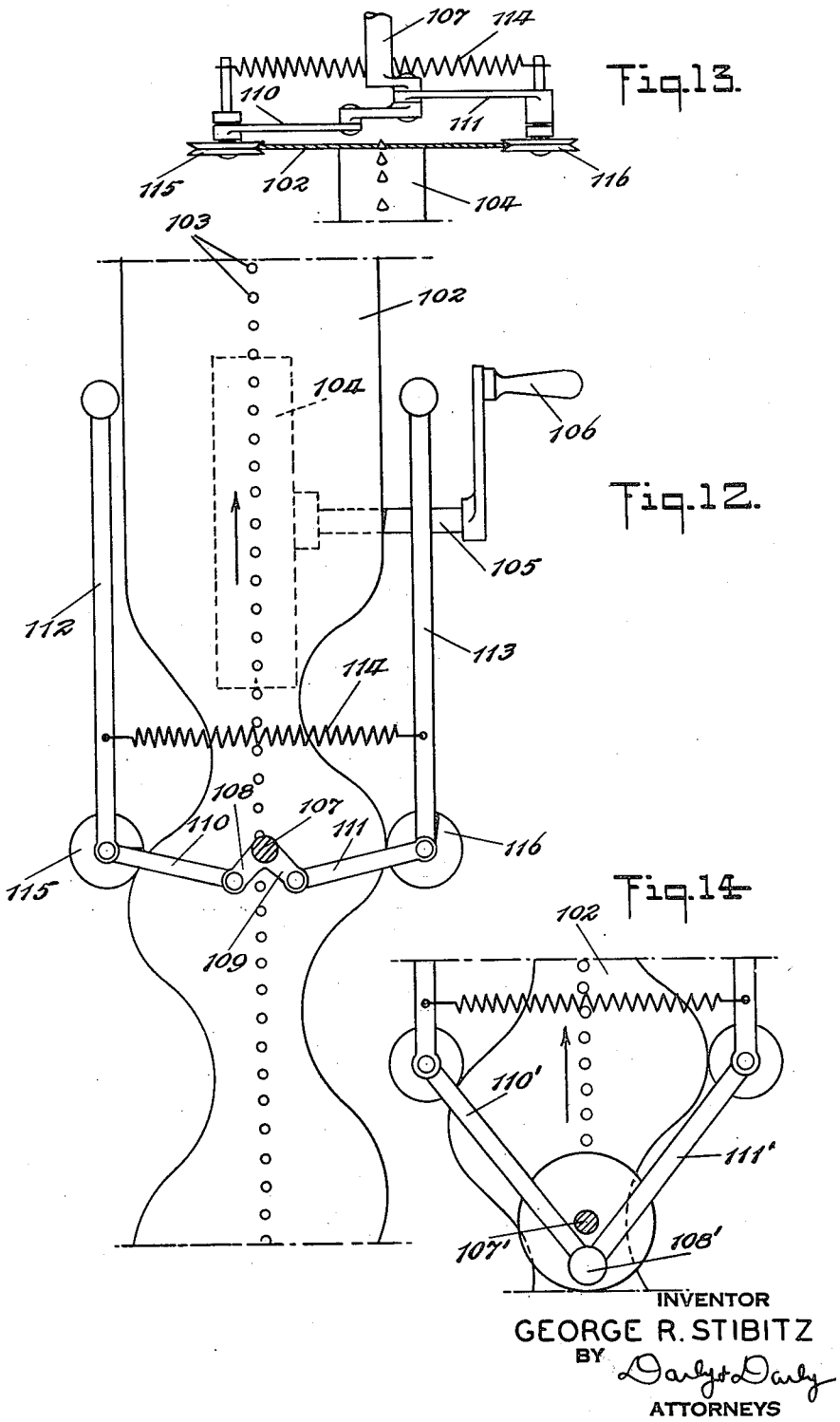

Nov. 13, 1956  G. R. STIBITZ  2,770,145
FUNCTION UNIT
Original Filed Feb. 12, 1948  10 Sheets-Sheet 7
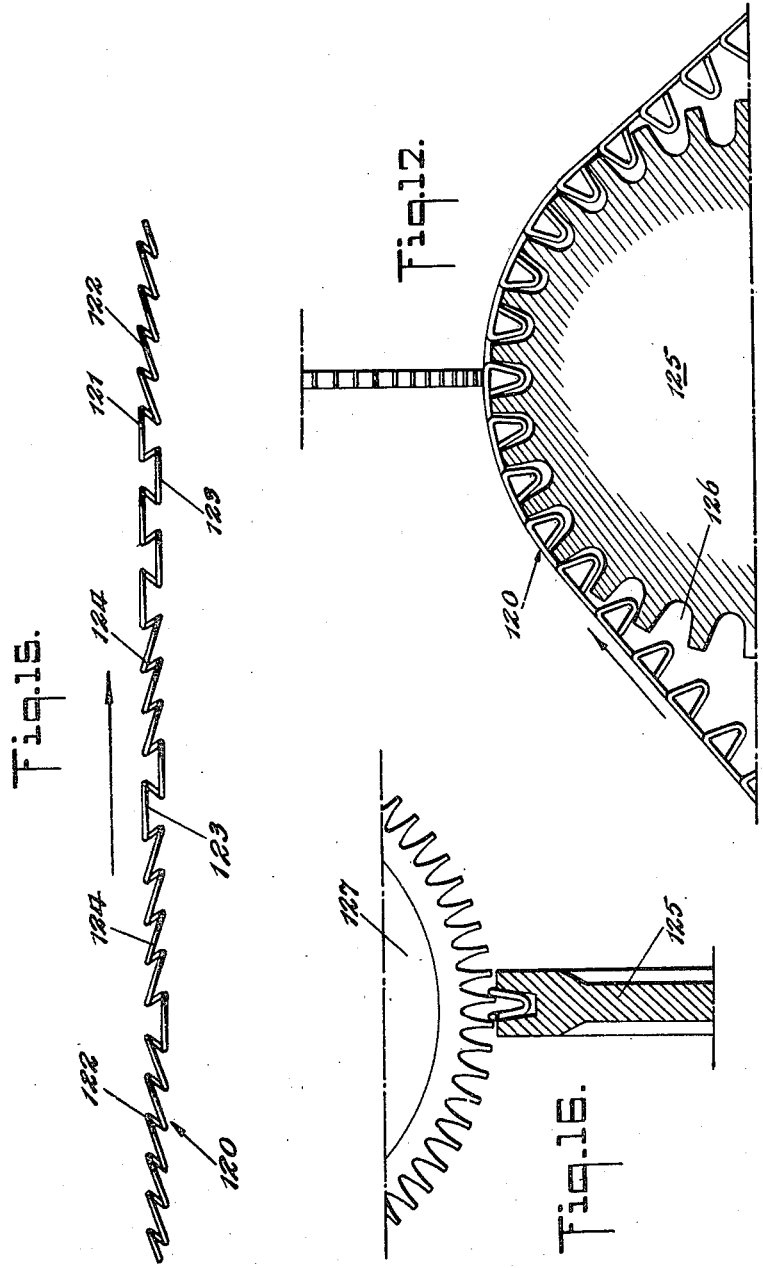
INVENTOR
GEORGE R. STIBITZ
BY Daly & Daly
ATTORNEYS

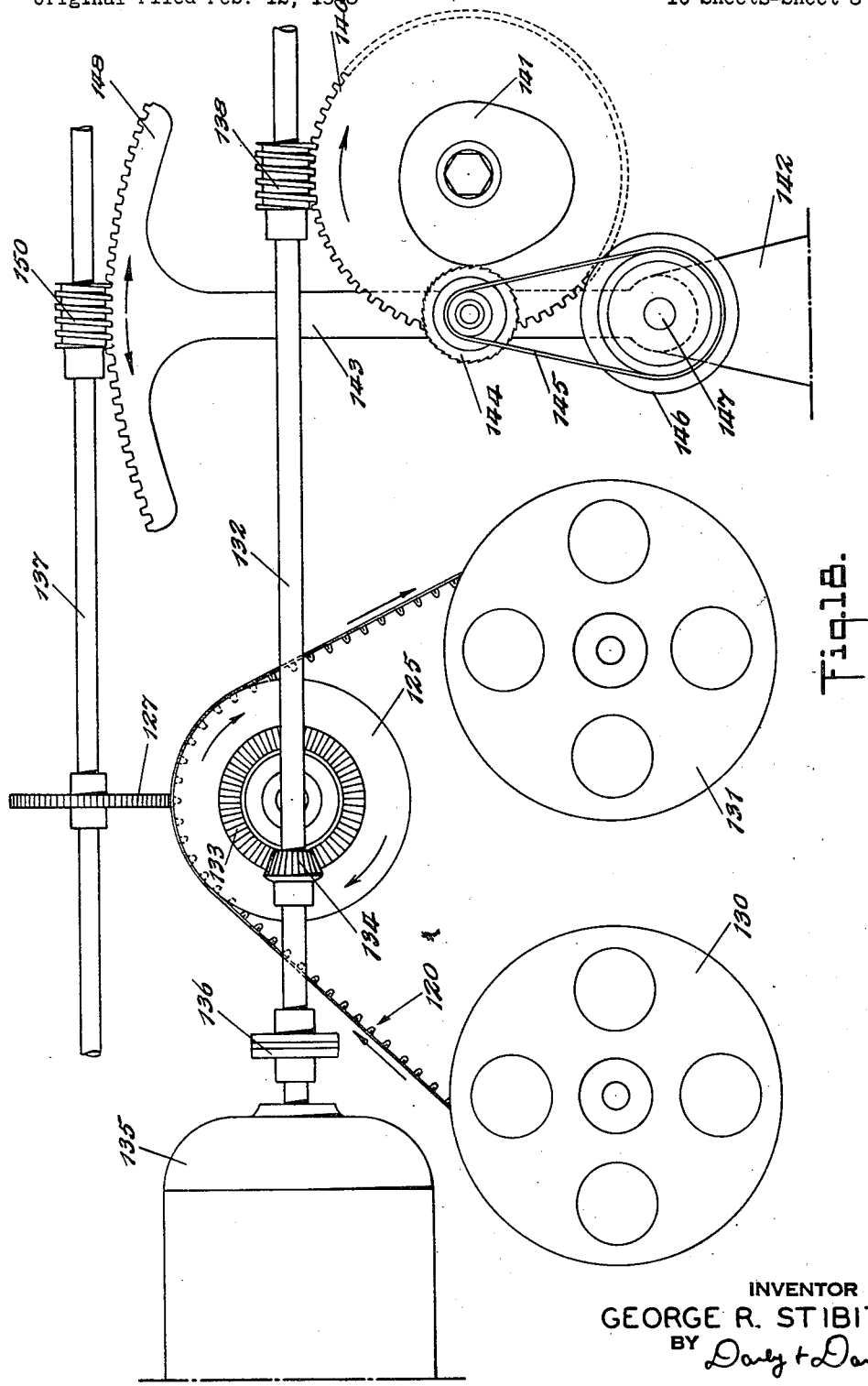

Nov. 13, 1956 G. R. STIBITZ 2,770,145
FUNCTION UNIT
Original Filed Feb. 12, 1948 10 Sheets-Sheet 9

INVENTOR.
GEORGE R. STIBITZ
BY
ATTORNEYS

Nov. 13, 1956  G. R. STIBITZ  2,770,145
FUNCTION UNIT
Original Filed Feb. 12, 1948  10 Sheets-Sheet 10

INVENTOR.
GEORGE R. STIBITZ
BY
ATTORNEYS

United States Patent Office 2,770,145
Patented Nov. 13, 1956

2,770,145

FUNCTION UNIT

George R. Stibitz, Burlington, Vt.

Continuation of application Serial No. 7,982, February 12, 1948. This application April 13, 1954, Serial No. 422,844

28 Claims. (Cl. 74—393)

The present invention relates to function units, that is, devices which serve to transform an input movement into an output movement in accordance with some mathematical law or arbitrary relationship.

More particularly, the invention relates to a device by means of which a certain number of revolutions of an input shaft causes an output shaft to rotate through a number of revolutions dependent upon the input revolutions in accordance with some mathematical law or arbitrary relationship. In these devices a controlling element is interposed between the input shaft and the output shaft and this element incorporates the law which is to be followed. The particular controlling element is not permanently incorporated in the mechanism but is changeable so that the law of operation of the output shaft with respect to the input shaft may be changed at will.

By combination of a number of such function units together with differential drives, complex mathematical computations may be made with extreme ease and with great saving in time over manual methods of performing the same computations. By means of such combinations of units, multiplication, transformation to sines or cosines of angles and various other resolutions of mathematical quantities and forces represented thereby may be performed. Additionally, these function units may be utilized for control of machine operations, as for example, milling machine operations, lathe operations, etc.

As indicated above, the basic principles underlying the construction of these function units is that upon a certain rotation of a shaft X another shaft Y will be rotated in a predetermined relation to shaft X. This relationship may of course be formally represented by the equation $Y=f(X)$. For example, this relationship may be as follows:

When $X=0°$     $Y=437°$
When $X=10°$    $Y=485°$
When $X=20°$    $Y=450°$ etc.

Such a condition can be satisfied by the ordinary cam surface but with the disadvantage that in the cam arrangement purely measured lengths are utilized whereas in my function units the values X and Y are primarily counted quantities and due to the fact that counting is an exact process are not liable to error as is the position of a cam along a measured length thereof.

Since my function units comprise shafts and gearing all cumulative error is eliminated, since no matter how many revolutions the geared shafts may make their relative positions are always known with an accuracy depending only upon the backlash of the gear train, which is constant rather than cumulative.

Moreover, since the controlling element may be a tape, a wire or other similar device serving as a positive controlling means and being therefore similar to a gear and since the tape may conveniently be of great length so that each unit of movement effects a small adjustment of the output shaft relative to the total movement of the output shaft, it is possible to provide a large scale factor. In other words, the output is a shaft rotation which is positively related in any arbitrary predetermined manner to the rotation of the input shaft and the relative accuracy is limited only by the tape length and not by the precision of workmanship.

In certain forms of my invention the pattern which determines the incremental displacement of the output shaft may be looked upon as a mechanical representation of components of a vector rotating in unison with the output shaft. In order that the vector be completely determined at all times, at least two such components must be represented, these components being at distinct phases, the entire set of components being a polyphase representation of the rotating vector. For practical reasons it may be desirable to represent more than two components. It must be understood that the term "representation" is in the above discussion used in a general mathematical sense.

In general, all of the embodiments of my function unit hereinafter described, provide a controlling element in the form of a tape or wire which is driven through a definite distance for each increment of angular movement of the input shaft and which tape carries thereon a physical pattern for effecting control of an output shaft so that the angular increments of rotation of the output shaft bear a definite predetermined relationship to the angular increments of movement of the input shaft, the mechanisms being arranged to provide a positive interlock between the input and output shafts assuring that rather than having the output shaft moved through an incorrect number of angular increments the input shaft will be prevented from moving or the mechanism will break. Thus it is impossible for an indication to be given at the output which is not a true function, as determined by the control tape, of the real variable inserted by incremental rotation of the input shaft.

The foregoing has attempted to set forth the general principles upon which my function units are based. The various embodiments which will be hereinafter discussed all comprehend these fundamental principles but differ in the manner in which the tape or wire, or other medium, is constructed to bring about the desired relationship between the number of rotations of the input shaft and the number of rotations of the output shaft.

It is to be understood that the function units may be combined with other equipment as, for example, differential drives in order to perform the various computational solutions and machine controls hereinabove and hereinafter mentioned.

As an example of such combination which will be further described subsequently, it is possible by the utilization of two function units and three differential drives to compute the product of two factors $x$ and $y$, this being accomplished by solving the equation in the following manner: In one differential $x$ and $y$ are added and in the second differential $x$ and $y$ are subtracted. In a function unit associated with the first differential the sum $(x+y)$ is squared and in a second function unit the difference $(x-y)$ is squared. Following this, in a third differential, the output of the second function unit is subtracted from the output of the first and by a proper gearing or scale dimensioning, the output of this third and final differential becomes the desired product. In other words, the product $xy$ is found by utilizing the equations:

$$\tfrac{1}{4}(x+y)^2 - \tfrac{1}{4}(x-y)^2 = \tfrac{1}{4}(x^2+2xy+y^2) -$$

$$\tfrac{1}{4}(x^2-2xy+y^2) = \frac{4xy}{4} = xy$$

In a similar manner, a combination of three function units and three differentials may be utilized to compute the value of $r$ sine $\theta$ when the values of $r$ and the angle $\theta$ but not its sine are known.

It is an object of the present invention to provide a device in which a large number of rotations of an input shaft will cause a likewise relatively large number of rotations of an output shaft, the exact number being dependent upon a control intermediate the shafts, in accordance with a particular mathematical law.

Another object of the invention is to provide such a unit as that described above which may be readily combined with other units of the same character and with other mechanical devices such as differential drives to perform solutions of involved mathematical equations.

It is still another object of the invention to provide such function units which, in combination, and in combination with mechanical devices such as differential drives may be utilized to control operation of machine tools, such as milling machines, lathes, shapers, cam cutters, etc.

It is a further object of the invention to provide means for entering the law of operation into these function units which means are simple in construction and in operation, and which operate as counters rather than as scaler variations.

It is a still further object of the invention to provide means for entering the law of operations into the function units which means may be easily made and readily inserted into and removed from the function unit in order that the same basic unit may be utilized to control operation in accordance with different mathematical and arbitrary relationships.

Other objects and features of the invention will appear when the following description is considered in connection with the annexed drawings, in which, Figure 1 is a transverse cross sectional view of one form of function unit designed to utilize embossed tape as the controlling element;

Figure 3:
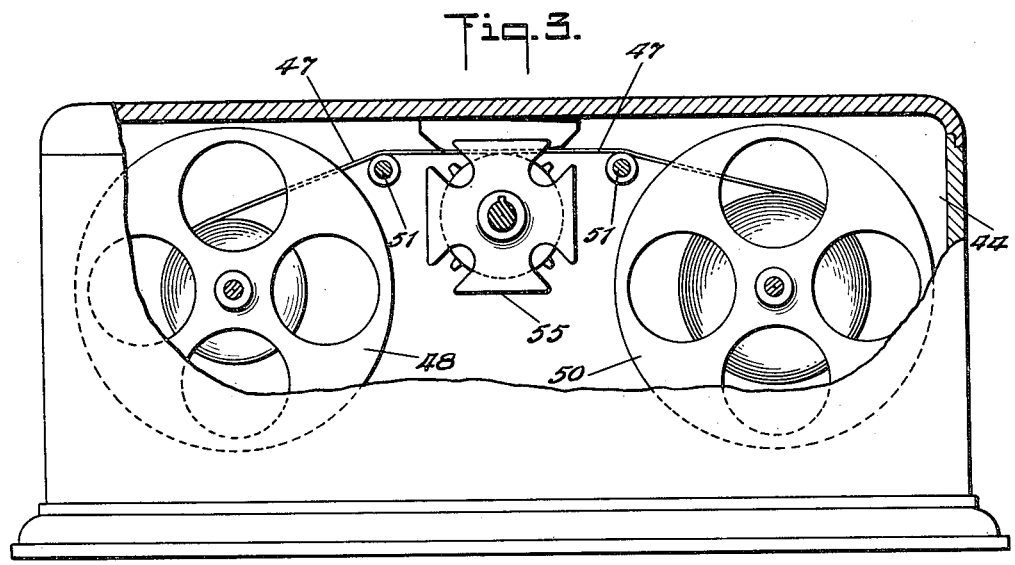
Figure 3 is a side elevation partially broken away of a second form of function unit in which the controlling element is a perforated and tabbed tape which cooperates with a Geneva drive.
Figure 4:
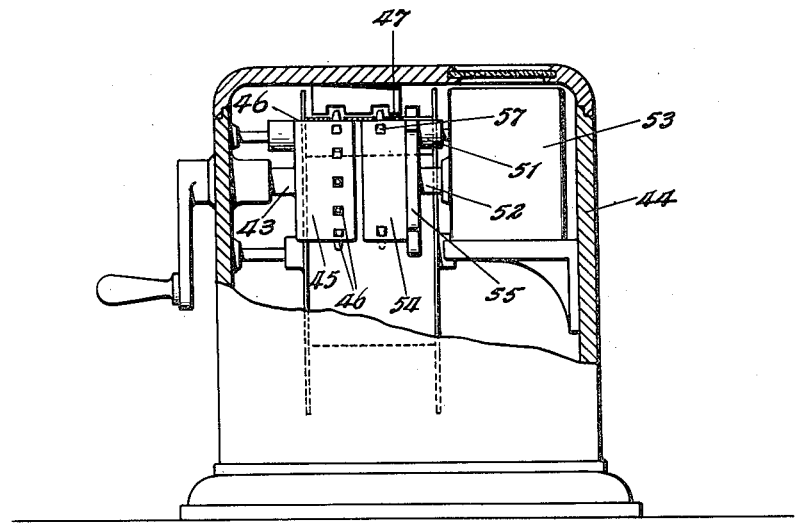
Figure 4 is an end elevation partially broken away of the form of unit of Figure 3.
Figure 19:
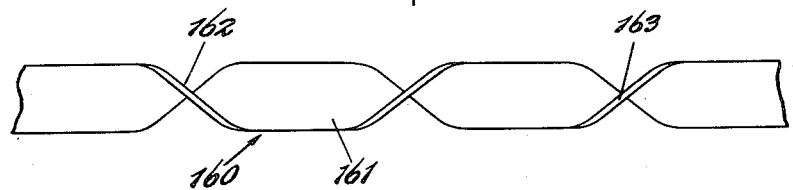
Figure 20:
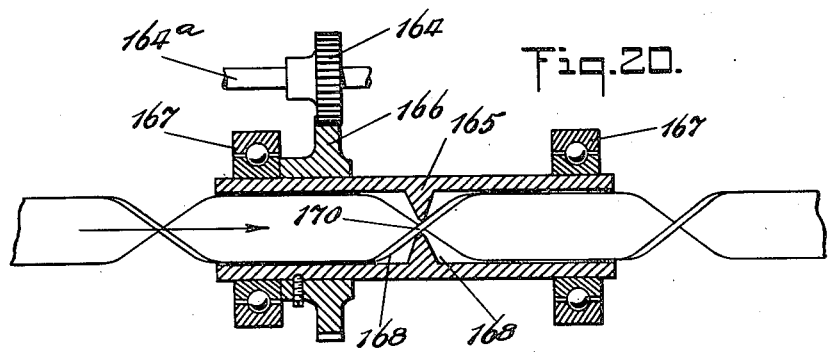
Figure 21:
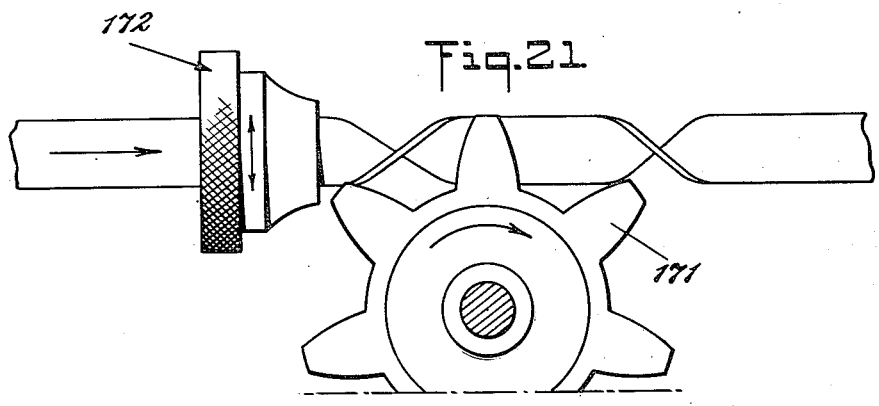

Figrue 5 is a top plan view of the unit of Figures 3 and 4, the cover being broken away to show the interior mechanism;

Figure 6 is a fragmentary view of a tape for utilization in the unit of Figures 3 through 5;

Figure 7 is an end elevation with the cover broken away of a third form of function unit which form utilizes a perforated tape in combination with certain feeler pins;

Figure 8 is a fragmentary view of a tape suitable for use with the unit of Figure 7;

Figure 9 is a side elevation of the function unit of Figure 7 the cover being broken away in order to show the operating parts;

Figure 10 is a detailed view showing the relationship of certain gears of the mechanism of Figures 7 and 9;

Figure 11 is a detailed view showing a cam utilized for lifting certain feeler pins of the mechanism of Figures 7 and 9;

Figure 12 is a fragmentary view of a fourth modification of function unit showing the utilization of a scalloped tape as a controlling element;

Figure 13 is an end elevation of the mechanism of Figure 12;

Figure 14 is a view showing a slight modification of the arrangement of the parts of a mechanism similar to that of Figure 12 and which likewise utilizes a scalloped tape as the controlling element;

Figure 15 is a top plan view of a helicoid wire adapted to be used as the controlling element in a function unit;

Figure 16 is a fragmentary view of a mechanism which utilizes the helicoid wire control element of Figure 15;

Figure 17 is a fragmentary sectional view of the mechanism of Figure 16, further illustrating its mode of operation;

Figure 18 is a diagrammatic view illustrating the utilization of the function unit and control tape or wire of Figures 15, 16, and 17 in controlling the operation of a milling cutter for forming a cam surface;

Figure 19 is a fragmentary view showing a section of wire similar to that illustrated in Figure 15 but in which that wire is rectangular in cross section rather than round and the unit lengths instead of being inclined in different directions are twisted about their longitudinal axis;

Figure 20 is a top plan view of one form of a device which operates under control of a twisted rectangular wire such as that illustrated in Figure 19;

Figure 21 is a view illustrating a form of gear which may serve to pull the tape of Figure 19 through the output shaft of Figure 20. Likewise this pulling device may serve for advancing the tape through a unit by means of which the tape is twisted in accordance with the particular mathematical law or arbitary relationship which is to be followed. Such a twisting device is also shown in Figure 21.

Figure 22:
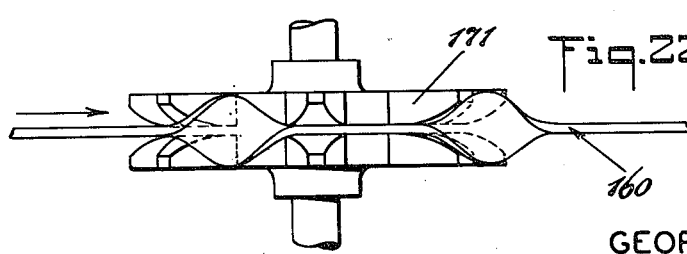
Figure 23:
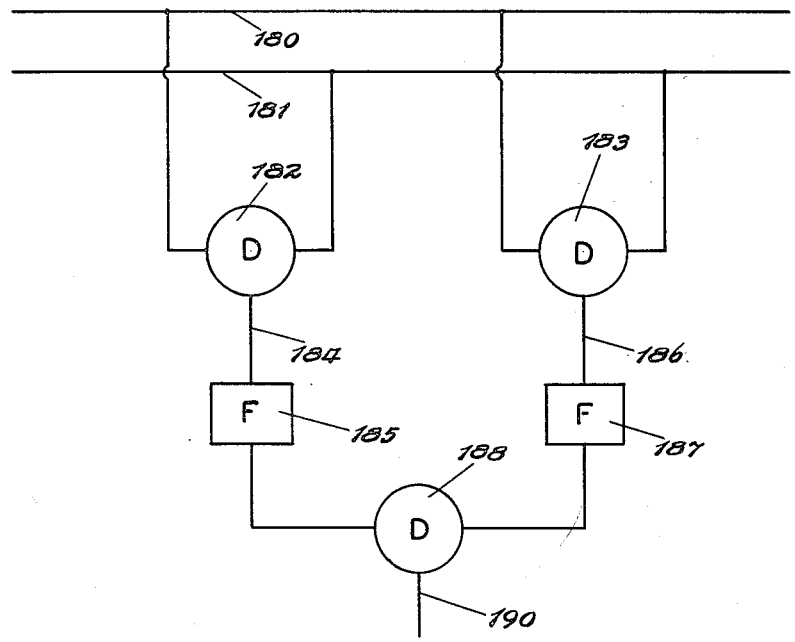
Figure 24:
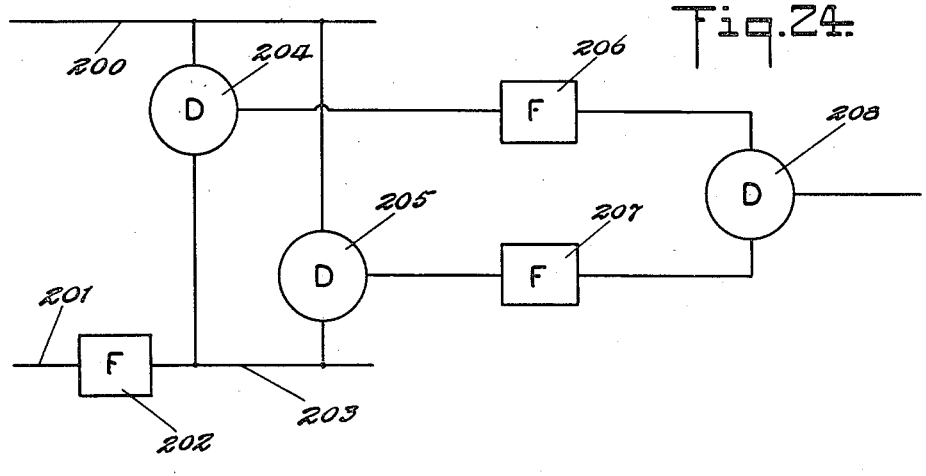

Figure 22 is a top plan view of the gear of Figure 21;

Figure 23 is a diagrammatic illustration showing the combination of two function units and three differentials adapted to calculate a product $xy$; and Figure 24 is a diagrammatic illustration showing the combination of three function units and three differentials arranged to calculate the quantity $r$ sine $\theta$ when the values of $r$ and $\theta$ are known.

The present application is a continuation of my prior application Serial No. 7,982, filed February 12, 1948. No claims are made herein to the species of the invention illustrated in Figures 7–9; this species is described and claimed in my copending application filed concurrently herewith.

Figure 1:
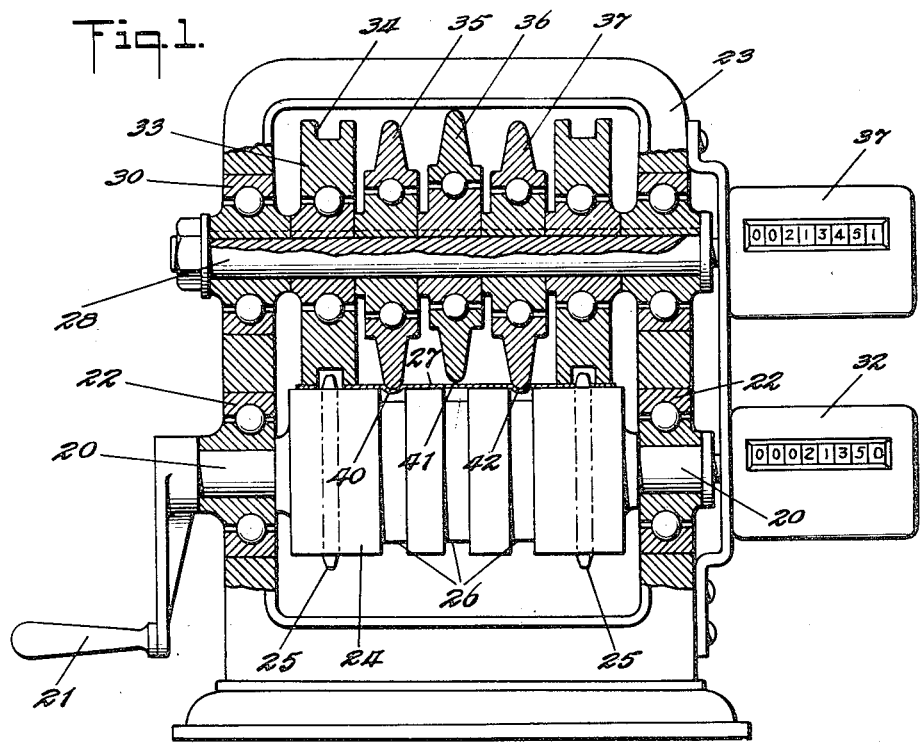
Figure 2:
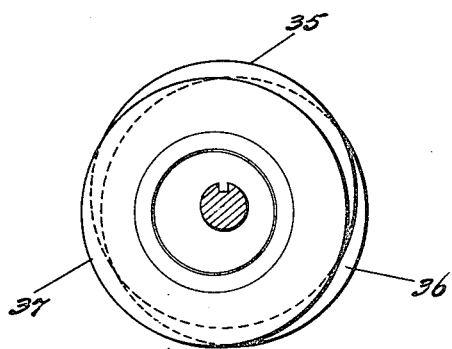
Figure 2 is a side elevation of certain eccentrics utilized in the unit of Figure 1.

Referring now to Figures 1 and 2, the form of function unit shown therein comprises an input shaft 20 having a handle 21 fixed thereto at one end, the shaft being mounted in ball bearings 22 which are suitably fixed in a housing 23. Fastened to the shaft 20 is a drum 24 having sprocket teeth 25 integral therewith adjacent the ends. The drum 24 is provided with three peripheral grooves 26 in its central portion, these grooves cooperating with embossed grooves in a control tape 27. Tape 27 is fed from a reel, not shown, driven by the sprocket teeth 25 which extend through cooperating perforations in the tape which perforations thus constitute the driving elements mentioned above, and thence is stored upon a takeup reel, not shown.

Mounted above the shaft 20 is a shaft 28 which, like shaft 20, is supported in ball bearings 30 in the housing 23. The shaft 28 is the output shaft and is provided with a counter 31 in the same manner as shaft 20, the input shaft, is provided with a counter 32.

Mounted upon shaft 28 at either end thereof within the housing 23 is a ball bearing 33, the outer race of which is provided with a peripheral groove 34. The outer race of the bearing 33 bears against the tape 27 on the drum 24 and the sprocket teeth 25 which extend through the tape 27 ride in the peripheral grooves 34, mentioned above.

Also mounted on shaft 28 are three eccentrics 35, 36 and 37. These eccentrics are mounted on the shaft in a three-phase relationship to each other, that is, in such manner that the eccentric 35 will be in its maximum downward position at a time when eccentric 36 is 120° from this maximum downward position in one direction and eccentric 37 is 120° from the maximum downward position in the opposite direction.

The tape 27 is provided with three embossed grooves at 40, 41 and 42 and these grooves are of varying depths in accordance with the mathematical or arbitrary law which is to govern the relationship of the position of the output shaft to the rotation of the input shaft. These three grooves constitute a set of patterns the individual ones of which bear a particular relationship to the driving element and to the other patterns of the set. The relationship of the eccentrics 35, 36 and 37 is brought out in Figure 2 which shows these three disks mounted on their shaft 28 in the relative positions which they occupy, namely at 120° to each other.

Consideration of the showing of Figure 2 together with the foregoing description will show that as the crank 21 is turned and the shaft 20 rotated the tape 27 is fed through the device by virtue of the cooperation of the sprocket teeth 25 with the feed holes in the tape and that the shaft 28 will be rotated in either direction or permitted to stand still in accordance with the variations in depth of the embossed grooves 40, 41 and 42 in the tape 27.

Thus Figures 1 and 2 illustrate one form of the invention wherein the pattern which determines the incremental displacement of the output shaft can be considered as a mechanical representation of a vector rotating in unison with the output shaft. Each component is represented in this case by one of the tracks in the tape 27 and is formed, as has been indicated, by embossing the material so as to produce an undulating or wave-like surface. The cam surface of the track or the contour thereof is best described as being that surface generated by the motion of the respective mechanism; the surface or contour generated by each eccentric of Figure 1 may be described as trochoid-like, it being understood that the surface is not an exact trochoid in the mathematical sense.

As will be clear the different cam tracks or grooves 40, 41 and 42 may if desired be placed on separate tapes, all driven by identical sprocket wheels through identical feed holes therein. The number of cam tracks may be changed but if this is done the phase displacement thereof and the phase displacement of the eccentrics must be correspondingly modified.

Another embodiment of my invention in which a perforated and tabbed tape is utilized rather than the embossed tape described above is shown in Figures 3, 4 and 5. This function unit comprises an input shaft 43 which is suitably mounted in bearings in a housing 44 and which carries at its inward end a feed wheel or drum 45 provided with sprocket teeth 46. A control tape 47 is led from a feed reel 48 over the drum 45 and thence to a take-up reel 50, the tape passing over the supporting rollers 51 as is clearly seen in Figure 3.

Mounted in axial alignment with the input shaft 43 is an output shaft 52 which is suitably supported and carries on its outer end a counter 53. Likewise mounted on the shaft 52 is a sprocket wheel or drum 54 and a Geneva wheel 55.

The controlling tape used with this device is provided with tabs 56 which cooperate with the Geneva wheel 55 and positively drive it through an angle of 90° during the passage of each tab.

Drum 54 is additionally provided with sprocket teeth 57, these teeth being located intermediate the teeth of the Geneva wheel 55 or, in other words, centrally of the space between the teeth of the Geneva wheel. Perforations 58 in the tape 47 cooperate with the teeth 57 and prevent movement of the output shaft 52 except when driven by the tabs 56. This results from the fact that the tape 47 is pressed against the surface of the feed sprocket 45 and the driven sprocket 54 and thus the driven shaft 52 cannot rotate unless there is a hole through which a tooth 57 may pass.

As will be seen, by variations of the locations of the tabs 56 and of the corresponding holes 58 the total angular movement of the output shaft at any given instant may bear any monotonic relationship to the total angular movement of the input shaft 43 at the same instant accurately to within one eighth of an increment.

In Figure 7 there is shown another form of function unit in which a perforated tape is utilized to govern the relative number of revolutions of an output shaft and counter as compared with the revolutions of an input shaft and its counter. An input shaft 60 is supported at one end in the housing 61 and at the opposite end in a bracket 62 which is fixed to the base of the device. Shaft 60 carries a crank 63 and a gear 64, the gear 64 meshing with gears 65 and 66. The gear 64 is a mutilated gear being provided with teeth on only one half of its circumference and therefore rotates the gears 65 and 66 alternately (Figure 10), the gear being shaped so that the non-driven gear is locked against rotation. Gear 66 is fixed to a shaft 67 which shaft is supported in the housing 61 and the bracket 62 and carries at its forward end a grooved drum 68 having the sprocket teeth 70 thereon near its ends and the three peripheral grooves 71 spaced across it.

Additionally, the shaft 67 carries the two cams 72 which serve to raise and lower certain sensing fingers 73. Cams 72 are formed as is shown in Figure 11 and cooperate with cam rollers 74 one of which is mounted at each end of a bar 75 which extends axially of the drum 68, the bar being held in its maximum downward position, with the rollers 74 against the cams 72, by means of the springs 76 which are compressed between the bar 75 and the upper end of bracket 62 or a similar bracket 77 fixed to the housing 61. Mounted in position above the drum 68 and beneath the bar 75 is a block 78 having apertures 79 formed therein in which are mounted the sensing pins or fingers 73. Each of these sensing fingers is provided with a collar 80 and a spring 81, the spring 81 cooperating with a shoulder at the upper end of the apertures 79 to force the sensing fingers downwardly. Each sensing finger is also provided with a guiding portion 82 which extends through the narrow portion of the aperture 79 as well as through apertures in the bar 75. Also, each sensing finger is provided with an enlarged head 83 which head cooperates with a certain gear of a differential as will be hereinafter described.

The control tape 84, Figures 7 and 8, is provided with feed holes 85 which cooperate with the sprocket teeth 70 on the drum 68 and feed the tape from the feed roll 86, Figure 9, over the guide rollers 87 and thence over the drum 68 and over additional guide rollers 87 to the take-up reel 88.

For each turn of the input crank 63 the drum 68 is advanced through a predetermined arc, in the particular instance, a 90° arc. At the start of the rotation, the cams 72 acting upon the rollers 74 raise the bar 75 which carries three sensing fingers 73 upwardly and out of contact with the tape 84. The tape is then advanced through the distance between one set of control holes 89 (Figure 8), and the following set after which the cam rollers descend into a low spot in the cams and the bar 75 is lowered.

Any feeler pins which lie above holes in the tape are forced downwardly by their respective springs 81 and project through the holes 89 in the tape 84 and into the associated groove 71 in the drum 68. As will appear, the particular combination of control holes 89 which is punched in the tape 84 at any one position will govern the position of the three sensing fingers and will thus determine which of certain differential gears are to be prevented from operating.

As hereinbefore stated, gear 64 drives gears 65 and 66 alternately (see Figure 10). When gear 65 is rotated, it causes rotation of the shaft 90, due to its direct coupling to the shaft, and likewise causes rotation in the opposite direction of the sleeve 91, due to the interposition of the bevel gears 91ᵃ, 91ᵇ and 91ᶜ.

As a result, the two differential spiders 92—one fixed to the shaft 90 and one to the sleeve 91—are rotated in reverse directions. Each spider 92 carries a differential pinion 93. Each of these differential pinions meshes with a pair of bevel gears 94, these bevel gears being loosely mounted on the shaft 90 and the sleeve 91, respectively. Fixed to the left-hand one of the pair of bevel gears 94 is a spur gear 95 which cooperates with the left-hand one of the sensing fingers 73 or, more exactly, with the head 83 of this sensing finger. In a like manner the central ones of the bevel gears 94 are fixed to a spur gear 96 which cooperates with the head 83 of the central one of the sensing fingers 73; also, the outer or right-hand one of the bevel gears 94 is fixed to a spur gear 97 which cooperates with the head 83 of the right-hand one of these sensing fingers 73.

It should be noted that the shaft 90 is directly coupled to an input counter 99.

Extending across the housing 61 above shaft 90 is a shaft 98 which carries a spur gear 100 which gear meshes with the spur gear 96. Thus, any rotation of the gear 96 is imparted to gear 100 and through it to the output shaft 98 and to the output counter 101 driven by that shaft.

It will be seen that shaft 90 is driven through a unit of movement during the interval when the tape 84 is stationary and the pins 73 are positioned in accordance with the control perforations 89 in the tape 84. If the two outer ones of the sensing fingers 73 pass through the tape then the head 83 of the central pin 73 lies in a tooth space of gear 96 and prevents it from rotating, and the movement of gears 95 and 97 is without effect. If the two right hand ones of the sensing fingers pass through the tape then gear 95 is prevented from rotating and the action of the differential gearing causes the central spur gear 96 to be rotated through a predetermined angular amount in one direction. Again, if the two left hand ones of the sensing fingers pass through the tape, then gear 97 is prevented from rotating and the action of the differential causes the central spur gear 96 to be again rotated through the same predetermined angle, but in a direction opposite to that in which it rotated when gear 95 was held. Thus by properly perforating the control tape 84 it is possible to advance the output shaft 98 through one unit of movement in either direction, or to prevent any movement of the output shaft while at the same time advancing the input shaft in one direction through a unit of movement.

Of course, more than three sensing fingers may be utilized and the mechanism then arranged, for example, to cause double increments of movement in either direction in response to these fingers.

A still further embodiment of my invention is illustrated in Figures 12 and 13. In this arrangement a control tape 102 is utilized, being driven by means of feed holes 103 cooperating with a sprocket wheel 104, mounted on shaft 105. Shaft 105 is driven in any suitable manner, as for example by means of the crank 106. In this instance the tape 102 is formed with curved edges which determine the movement of output shaft 107 to be brought about by movement of the input shaft 105. Shaft 107 is provided with two crank arms 108 and 109 with which the connecting rods 110 and 111, respectively, cooperate. Arm 110 is supported at the end of a pivotally mounted link 112 and in like manner the arm 111 is supported at the end of a pivotally mounted link 113, links 112 and 113 being joined by a spring 114. At the juncture of link 112 and connecting rod 110 there is rotatably mounted a roller 115 and in similar manner there is rotatably mounted at the juncture of connecting rod 111 and link 113 a roller 116. These rollers bear against the curved or scalloped edge of the control tape 102 and thus as the tape is advanced between rollers 115 and 116 output shaft 107 is caused to rotate in accordance with the curvature of the tape edges.

It should be noted that the edges of tape 102 carry complementary curves, that is, the curve is displaced along one edge with respect to its position on the other edge, the displacement being a linear amount equivalent to a 90° rotation of the crank shaft 107. Because of the fact that the crank arms 108 and 109 are likewise displaced angularly through 90° this results in eliminating any possibility of the crank shaft coming to a dead center position.

The form of the invention illustrated in Figures 12 through 14 is a second form wherein the pattern which determines the incremental displacement of the output shaft can be looked upon as a mechanical representation of components of a vector rotating in unison with the output shaft. In this case each component is represented by a track or cam contour formed by cutting away material from an edge of the tape so as to leave an undulating or wave-like surface as is shown at the tape edges of Figure 12. The surface of the edge of the tape or the contour is here again best described as being that surface generated by the motion of the cam followers 115 and 116.

Again the cam tracks may be separated or a greater number supplied, the phase displacement of the cam tracks and of the followers being accordingly modified.

Figure 14 illustrates a slight modification of the device of Figure 13. In this instance connecting rods 110' and 111' are connected directly to a crank pin 108' on the shaft 107'. The connecting rods 110' and 111' are at a 90° angle to each other and this arrangement again serves to prevent a dead center position and consequent failure of operation of the device.

Another form of the function unit of my invention is illustrated in Figures 15, 16 and 17. In this arrangement the tape is in the form of a wire 120 rather than the perforated or scalloped tapes which have been heretofore discussed. This wire is bent in the manner illustrated particularly in Figure 15, forming what may be called gear teeth upon the wire. The wire is divided into a number of unit lengths indicated by the reference numeral 121, and these lengths may be inclined in one direction as indicated at 122 or may be parallel to the axis of the complete wire length as indicated at 123 or may be inclined in the opposite direction as is indicated at 124.

A wire such as that just above described is fed from a reel to a toothed gear-like member 125 (Figures 16 and 17), the loops of the wire which join the unit lengths lying in the tooth spaces 126 of the member 125 as is clearly seen in the two mentioned figures. Member 125 is mounted upon an input shaft (not shown) which is rotated in either direction. Mounted above the member 125 and on an axis at right angles to that of member 125 is a gear 127, the toothed surface of which lies adjacent to the periphery of the gear-like member 125. As the wire 120 is advanced by means of member 125, the gear 127 is advanced in either direction or caused to remain stationary in accordance with the inclination of the unit section of the wire 120 passing beneath the gear 127. It should be noted that the number of teeth on the gear 127 is sufficiently great so that two tooth spaces overlie the wire (see Figure 16), and thus the offset parallel sections such as those at 123 can pass through adjacent tooth spaces of the gear without causing rotation thereof.

Although the device just above described is of considerable practical value in connection with the insertion of a mathematical law into an equation solver or other device for performing computations, it, and, in fact, all the devices described, is likewise of value in controlling the operations of various machines. In Figure 18 a tape of this character has been illustrated for controlling a milling machine utilized for cutting a cam.

Referring now to Figure 18, a wire 120 similar to the one just above described is fed from a reel 130 over a gear-like member 125 and on to a suitable takeup reel 131. The gear 125 is driven from a shaft 132 through the medium of the beveled gear 133 and pinion 134. Shaft 132 is rotated by means of the motor 135 acting through the coupling 136. Mounted above the gear 125 is a gear exactly similar to the gear 127 of Figures 15–17, and therefore given the same reference character. Gear 127 is mounted upon a shaft 137, this shaft consequently being rotated in accordance with the inclination given the unit lengths of the tape 120 a described hereinabove. Likewise mounted upon the shaft 132 is a worm 138 which cooperates with a worm wheel 140 suitably mounted for rotary movement and on the face of which is the cam blank 141.

Pivotally mounted upon the framework 142 or other suitable part of the milling machine is an arm 143 which carries a rotatably mounted milling cutter 144 driven by means of the belt 145. Belt 145 is driven in any suitable manner as for example, by means of pulley 146 rotatably mounted upon the pivot 147 on which arm 143 is supported. The upper end of arm 143 carries a toothed rack 148, the teeth being of worm wheel formation and meshing with a worm 150 fixed to shaft 137.

It will be seen that shaft 137 is rotated in either direction in relatively small increments thereby causing the milling cutter 144 to move toward or away from the cam blank 141, the milling cutter being constantly driven by means of the belt 145 as described. At the same time the cam blank 141 is constantly rotated in one direction by means of the drive exerted through shaft 132 and worm gear 138. By a proper layout of the inclination of the unit lengths of the tape 120, the amount of cut in each portion of the periphery of the cam blank 141 can be determined, and since of course, the amount of rotation of the cam blank is directly determined by the total length of the wire 120 and the gear ratio between gear 138 and worm wheel 140, the cam can be cut to any predetermined contour in any desired number of cuts.

As stated hereinabove, Figure 19 illustrates a modification of the wire arrangement of Figure 15 except that where Figure 15 illustrates a wire which is round in cross section having its unit lengths inclined with respect to its axis in order to carry out the controlling law of the device, Figure 19 illustrates a wire or tape which is rectangular in cross section and the unit lengths of which are rotated in one direction or another through 180° about its central longitudinal axis in order to carry out a control following the law embodied in the device.

Referring now to Figure 19, the tape 160 is composed of the unit lengths designated 161. Each unit length may be provided with a twist of 180° about its own center line as an axis, the twist being in either direction. Thus in Figure 19 at 162 there is illustrated a twist in one direction and at 163 a twist in the opposite direction.

When the tape, such as tape 160, is passed through the device of Figure 20 it will cause rotation of that device in one direction or another although the tape 160 may be constantly advanced in one direction. The device of Figure 20 comprises a hollow shaft 165 carrying gear 166 thereon and being supported in the bearings 167 which are indicated in the drawing to be ball bearings. The central section of shaft 165 is provided with the two chambers 168 between which is a narrow slit 170, the sides of which bear upon a tape 160 which is fed through the hollow shaft. Thus as the tape is advanced the unit lengths thereof are effective upon the walls of the slit 170 to cause rotation of the shaft 165 in unit steps in either direction. Gear 166 is, of course, meshed with another gear 164 which is placed upon an output shaft 164a so that the proper scaler value may be assigned to the input and output movements and normally if the machine is to be utilized for computational purposes, both the input and output shafts will be provided with counters.

A suitable mode of advancing a tape such as 160 of Figure 19 through a device such as that of Figure 20 is shown in Figures 21 and 22. This feeding device comprises a gear 171 having teeth which are slotted along the center line of the periphery thus providing spaces in which untwisted portions of the tape 160 may lie as it is pulled through the device of Figure 20, the twisted portions lying between teeth. The gear 171 may also be used to feed a tape undergoing twisting. In accomplishing this, a device 172 (Figure 21) comprising a nut like member having a rectangular bore therethrough is utilized. Thus for each advance of a tooth of gear 171, the twisting element 172 may either remain at rest or be rotated in either direction through a half turn and, of course, the desired tape be thus produced.

It has been stated hereinabove that combinations of any one of the function units heretofore described with differential drives can be arranged to perform mathematical computations. In Figure 23 is illustrated, in schematic form, a combination of function units and differentials designed to compute the product of two factors, $x$ and $y$. In this diagram the shafts are represented by straight lines and the gearing between two shafts is indicated by a dot on the intersection of the lines. A function unit is represented as a rectangle marked F and differentials are shown as circles with a D therein. Referring now to Figure 23, there are provided two shafts, one of which is an input shaft for the $x$ factor, and is designated 180, and the second of which is an input shaft for the $y$ factor, and is designated 181. The differential 182 is arranged to add $x$ to $y$ while the differential 183 is arranged to subtract $y$ from $x$. The output shaft 184 of the differential 182 feeds into the function unit 185 and in like manner, the output shaft 186 of the differential 183 feeds the function unit 187. The control tapes for function units 185 and 187 are laid out in accordance with square law, and thus the output from the function unit 185 is the square of the quantity inserted into it, or in other words is $(x+y)^2$. In like manner, the output from the function unit 187 is $(x-y)^2$. These two quantities are combined in the differential 188 in a subtractive manner. Thus the quantity on the final output shaft 190 will be $(x^2+2xy+y^2)-(x^2-2xy+y^2)$. This quantity reduces to $4xy$, but since the gearing at any desired stage, as, for example, between the differential 188 and the final output shaft 190, may be a reduction gearing with a 4 to 1 ratio, the quantity $xy$ is yielded.

Figure 24 is a schematic illustration (in the same notation as is used in Figure 23) of an arrangement for calculating the value of $r$ function $\theta$ and particularly for the calculation of $r \sin \theta$. Here the shaft 200 is the input shaft for the value of $r$ and the shaft 201 is the input shaft for the value of $\theta$ as expressed in any suitable angular measurement as for example, seconds. The rotation of shaft 201 is accordingly an amount proportional to $\theta$. The control tape or wire in the function unit 202 is such as to cause the output shaft 203 to turn through an amount proportional to $\sin \theta$.

Rotation of shaft 200 is proportional to the value of $r$ and in differential 204 the value of $\sin \theta$ is added to $r$ while in differential 205 the value of $\sin \theta$ is subtracted from $r$. In function unit 206 the value $r+\sin \theta$ is squared and likewise, in function unit 207 the value $r-\sin \theta$ is squared, these two units being provided with identical tapes expressing the square law. The output from the units 206 and 207 is fed to the differential 208 where it is subtracted, yielding $4r \sin \theta$ as the result. By proper reduction gearing or other suitable means, this value may be fed into a counter from which the value $r \sin \theta$ may be read. In other words, in the complete mechanism, $\sin \theta$ is added to and subtracted from $r$, these two values then being squared and the resulting squares subtracted one from the other yielding the final result. Mathematically this may be expressed as $(r+\sin \theta)^2-(r-\sin \theta)^2=r^2+2r \sin \theta+(\sin \theta)^2-(r^2-2r \sin \theta+(\sin \theta)^2)=4r \sin \theta$.

Then $$\frac{4r \sin \theta}{4}=r \sin \theta$$

the latter step being of course accomplished by any suitable form of reduction gear.

The foregoing description considered a number of different types of function units and likewise a number of different uses for such units and of modes for utilizing the units alone and in combination with other mechanisms for computing and for controlling. Obviously many other forms of units could be devised and these and the units described could be combined in different ways to perform the same or different computations and controlling functions. Consequently, I wish not to be limited to the forms and uses illustrated and described, but rather to be limited solely by the claims granted to me.

What is claimed is:

1. A function unit comprising a rotatable input shaft the amount of movement of which from a fixed reference point represents a real variable, a rotational output shaft the amount of rotation of which from a fixed reference represents a function of said real variable, pattern means bearing a physical pattern having predetermined characteristics arranged along a pattern path, said pattern means having a length much greater than its width or thickness means positively driving said pattern means from said input shaft in the direction of its length so as to impart movement to said pattern upon rotation of said input shaft and means cooperating with said pattern means for means positively driving said output shaft through said physical pattern to thereby vary the number of revolutions of said output shaft from said fixed reference in accordance with said physical pattern and the movement imparted theerto by said input shaft.

2. A function unit comprising a rotatable input shaft the amount of movement of which from a fixed reference point represents a real variable, a rotational output shaft the amount of rotation of which from a fixed reference represents a function of said real variable, a tape bearing a physical pattern having predetermined characteristics arranged along a pattern path, said tape being in positive driven connection with said input shaft so as to impart movement to said pattern upon rotation of said input shaft and said tape being in positive mechanical driving connection with said output shaft through the intermediary of said physical pattern to thereby vary the amount of rotation of said output shaft from said fixed reference in accordance with said physical pattern and the movement imparted to said tape by said input shaft.

3. A function unit as claimed in claim 2, characterized in that said tape is a long narrow ribbon and said physical pattern comprises a plurality of cyclically repeated curves therein.

4. A function unit as claimed in claim 2, characterized in that said tape comprises a long narrow ribbon and said physical pattern comprises a plurality of projections extending therefrom, said projections occurring in a predetermined manner.

5. A function unit as claimed in claim 2, characterized in that said tape comprises a long narrow ribbon and said physical pattern comprises a pair of in phase curves forming the edges of said ribbon, said curves being linearly displaced with respect to one another.

6. A function unit as claimed in claim 2, characterized in that said tape comprises a wire of great length, said wire being bent to form loops in a plane approximately at right angles to its direction of movement when driven by said input shaft and approximately at right angles to the axis of said input shaft, said loops forming a driving connection with said input shaft and further characterized in that said wire is inclined to the direction of its driven movement to form said physical pattern.

7. A function unit as claimed in claim 2, characterized in that said tape comprises a long narrow ribbon, said ribbon being twisted about its longitudinal axis at spaced intervals to form a driven connection with said input shaft, said twists and the direction of said twists forming said physical pattern whereby said output shaft is driven.

8. In a device of the class described, in combination, an input shaft having a sprocket wheel thereon, a tape driven by said sprocket wheel, said tape being provided with a plurality of longitudinal grooves of varying depths, a rotatably mounted output shaft, said output shaft having a plurality of eccentrics equal to the number of grooves in said tape fixed thereon, said eccentrics being mounted in out-of-phase relationship, the angle therebetween being dependent upon the number of eccentrics, said grooves of said tape being out of phase with respect to each other to the same extent as the angle between said eccentrics and said eccentrics being provided with eccentric straps which cooperate with the grooves in said tape whereby said output shaft is rotated by amounts proportional to the rotation of said input shaft as modified by the variations of depth of the grooves in said tape.

9. In a device of the class described, in combination, an input shaft having a sprocket wheel thereon, a tape driven by said sprocket wheel, said tape being provided with a plurality of longitudinal grooves of varying depths, a rotatably mounted output shaft, said output shaft having a plurality of eccentrics equal to the number of grooves in said tape fixed thereon, said eccentrics being mounted in out-of-phase relationship, the angle therebetween being dependent upon the number of eccentrics, said grooves of said tape being out of phase with respect to each other to the same extent as the angle between said eccentrics, said eccentrics being provided with eccentric straps which cooperate with the grooves in said tape whereby said output shaft is rotated by amounts proportional to the rotation of said input shaft as modified by the variations of depth of the grooves in said tape, and means engaging the upper surface of said tape to hold said tape in contact with said sprocket wheel.

10. In a device of the class described, in combination, an input shaft, a sprocket wheel thereon, an output shaft, a tape having perforations therein, said tape being driven by said input sprocket wheel, a Geneva wheel mounted on said output shaft, a plurality of marginal projections on said tape, said projections being placed on said tape in a predetermined arrangement, said projections cooperating with said Geneva wheel to drive said output sprocket to thereby impart to said output shaft a number of rotational steps dependent upon the movement of said input shaft and the predetermined arrangement of said projections on said tape.

11. A device in accordance with claim 10, characterized in that said tape is provided with a second row of perforations, said perforations in transverse alignment with said marginal projections and further characterized in that said output shaft has a sprocket wheel thereon, the teeth thereof lying intermediate the teeth of said Geneva wheel, said spaces between perforations of said second row preventing rotation of said output shaft except when driven by said marginal projections.

12. In a device of the class described, in combination, an input shaft, means for rotating said shaft, a feed drum mounted on said shaft and having sprocket teeth thereon, a tape having feed holes perforated therein, said holes cooperating with said sprocket teeth to feed said tape, said tape having its edges curved in a predetermined manner, the curve of one edge being identical with that of the opposite edge but said curves being phase displaced by linear displacements along said tape, a pair of levers pivotally mounted adjacent said tape and extending generally parallel to the longitudinal center line thereof, a roller at the frame end of each lever, one of said rollers riding on the curved surface at one side of the tape and the other roller on the curved surface on the opposite side thereof, an output shaft located between said lever ends and extending generally perpendicular to the plane of the tape, a pair of cranks mounted on said output shaft and a connecting rod extending from the free end of each of said levers to one of said cranks to thereby rotate said output shaft an amount dependent upon the rotation of the input shaft and the curvature of the edges of said tape.

13. In combination, a composite cam and cam follower mechanism wherein relative displacement of a composite cam track past a cam follower mechanism engaged in transit with said track causes a corresponding rotary displacement of an element of said follower mechanism in conformity with such mathematical law of transmitted motion as the combined mechanism may be arbitrarily designed to reproduce, said composite cam comprising at least one movable mechanical element wherein said cam incorporates a set of cam contours, supporting means and guiding means therefor, and common driving means, wherein said composite cam embodies a polyphase set of continuous transverse waves of arbitrary linear extent and constant but not necessarily identical amplitude, displaced in phase with respect to each other, of appropriate waveform and modulated in wavelength so as to represent corresponding polyphase components of a vector of constant length rotating continuously at a non-uniform rate with respect to the longitudinal co-ordinate of the polyphase wave set in conformity with said mathematical law of transmitted motion, each component wave of said polyphase wave set being borne in mechanical cam contour by a movable mechanical element of said composite cam, said movable mechanical element being provided with said supporting means and guiding means whereby the train of wave oscillations of said cam contour is constrained to travel lengthwise of said train past a cam follower mechanism as further described hereinafter, said composite cam incorporating said polyphase set of waves by means of at least one such movable element connected with said common driving means whereby the totality of component wave cam contours co-operates in polyphase unison as a composite multi-curve cam track, the polyphase train of wave oscillations embodied therein being guided in lengthwise transport past a cam follower mechanism engaged in transit with said composite cam track; said cam follower mechanism comprising a mechanical eccentric rotatably mounted and of constant radius of eccentricity wherein it embodies the aforesaid rotating vector of constant length having polyphase vector components of motion individually represented by corresponding component waves of the polyphase wave set, means to couple said mechanical eccentric with a driven load, and composite means to couple said mechanical eccentric phase-to-phase with the composite cam track, said composite means comprising individual mechanical coupling between each vector component of eccentric motion of said mechanical eccentric and the cam contour of a corresponding component wave of the polyphase wave set in mutual conformity with the waveform and phase of said component wave, said individual mechanical coupling in each case terminating at one end in a mechanical cam follower engaged with said component wave cam contour whereby said mechanical eccentric is constrained to rotate in synchronism with the wave oscillations of said cam contour as engaged in transit with said follower, the totality of said individual mechanical coupling co-operating in polyphase combination at such phase intervals as to eliminate the mechanical disadvantage of any dead center condition and ensure an equable phase-distribution of driving torque whereby said mechanical eccentric is constrained to rotate smoothly with passage of the composite cam track; said composite cam and cam follower mechanism cooperating as a mechanical coupling with varying transmission ratio by producing rotation of said mechanical eccentric through one turn per cycle of polyphase wave travel of the composite cam track past the follower mechanism, the number of polyphase wave cycles or wavelengths per unit length of cam track varying along the cam track in conformity with said mathematical law of transmitted motion.

14. In the combination of composite cam and cam follower mechanism as described in claim 13, incorporation of the polyphase set of waves in said composite cam wherein every component wave of said polyphase wave set is borne in mechanical cam contour by the same movable mechanical element, the totality of component wave cam contours co-operating in polyphase unison as a composite multi-curve cam track on a single cam body.

15. In the combination of composite cam and cam follower mechanism as described in claim 13, incorporation in said cam follower mechanism of a plurality of mechanical eccentrics of constant but not necessarily equal radii of eccentricity, mounted and coupled together mechanically so as to rotate in unison at fixed phase intervals, one mechanical eccentric of said plurality serving as a reference member to embody the rotating vector of constant length, the remainder of said mechanical eccentrics having eccentric motions proportional to and otherwise equivalent to the eccentric motion of said reference member except for individually differing spatial location and phase orientation of said motions whereby advantage is taken of said individual spatial location and phase orientation to facilitate the individual mechanical coupling between each vector component of eccentric motion and the cam contour of the corresponding component wave of the polyphase wave set, said individual mechanical coupling in each case engaging the corresponding vector component of eccentric motion of such particular mechanical eccentric as complies with said facilitating advantage, every mechanical eccentric being so engaged in at least one vector component of eccentric motion, whereby said reference mechanical eccentric is coupled phase-to-phase with the composite cam track in part by direct coupling and in part through intermediate coupling with the remainder of said plurality of mechanical eccentrics.

16. In the combination of composite cam and cam follower mechanism as described in claim 13, incorporation of the polyphase set of waves in said composite cam wherein at least one component wave of said polyphase wave set is embodied in mechanical cam contour of a movable mechanical element so that the transverse wave oscillations of said component wave are disposed parallel to said surface.

17. In the combination of composite cam and cam follower mechanism as described in claim 13, incorporation of the polyphase set of waves in said composite cam wherein at least one component wave of said polyphase wave set is embodied in mechanical cam contour locally modifying the surface of a movable mechanical element so that the transverse wave oscillations of said component wave are disposed at an angle with respect to said surface.

18. In the combination of composite cam and cam follower mechanism as described in claim 13, incorporation of the polyphase set of waves in said composite cam wherein at least one component wave of said polyphase wave set is embodied in mechanical cam contour locally modifying the surface of a movable mechanical element so that the transverse wave oscillations of said component wave are disposed perpendicular to said surface.

19. In the combination of composite cam and cam follower mechanism as described in claim 13, incorporation of the polyphase set of waves in said composite cam wherein at least one component wave of said polyphase wave set is embodied in mechanical cam contour along the length of a movable tape, said movable tape being provided with supporting means and guiding means adapted for connection with the common driving means of said composite cam whereby the train of wave oscillations of said cam contour is constrained to travel lengthwise of said train past a cam follower mechanism.

20. In combination, a composite cam and cam follower mechanism wherein relative displacement of a composite cam track past a cam follower mechanism engaged in transit with said track causes a corresponding rotary displacement of an element of said follower mechanism in conformity with such mathematical law of transmitted motion as the combined mechanism may be arbitrarily designed to reproduce; said composite cam comprising at least one moveable mechanical element wherein said cam incorporates a set of cam contours, supporting means and guiding means therefor, and common driving means, wherein said composite cam embodies a polyphase set of trochoidal waves of arbitrary linear extent and constant but not necessarily identical amplitude, displaced in phase with respect to each other and modulated in wavelength so as to represent the corresponding polyphase components of a vector of constant length rotating continuously at a non-uniform rate with respect to the longitudinal co-ordinate of the polyphase wave set in conformity with said mathematical law of transmitted motion, each component wave of said polyphase wave set being borne in mechanical cam contour by a movable mechanical element of said composite cam, said component wave acting as pitchline for said cam contour with equidistant clearance between said pitchline and said cam contour to accommodate a cam follower of circular cross section, said movable mechanical element being provided with said supporting means and guiding means whereby the train of wave oscillations of said cam contour is constrained to travel lengthwise of said train past a cam follower mechanism as further described hereinafter, said composite cam incorporating said polyphase set of waves by means of at least one such movable element connected with said common driving means whereby the totality of component wave cam contours co-operates in polyphase unison as a composite multicurve cam track, the polyphase train of wave oscillations embodied therein being guided in lengthwise transport past a cam follower mechanism engaged in transit with said composite cam track; said cam follower mechanism comprising a numerically equivalent polyphase set of mechanical eccentrics individually corresponding to the component waves of said cam track, mounted and adapted for relative motion with respect to said cam track as described hereinafter, and coupled together so as to rotate in unison at fixed phase intervals corresponding to the phase intervals between said component waves, means to couple said set of mechanical eccentrics with a driven load, and composite means to couple said set of mechanical eccentrics phase-to-phase with the composite cam track, said composite means comprising individual coupling between each mechanical eccentric and a corresponding cam contour, including means to maintain said individual coupling, wherein said mechanical eccentric has its principal axis mounted perpendicular to the transverse direction of wave oscillation of the pitchline of said cam contour and perpendicular to the longitudinal centerline of said pitchline, its eccentric axis parallel to said principal axis at a radius of eccentricity equal to the wave amplitude of said pitchline, and mounted coaxially upon said eccentric axis a cam follower with circular cross section of radius equal to the equidistant clearance between said pitchline and said cam contour and in constant tangent contact with said cam contour whereby said eccentric axis is constrained to intersect and follow said pitchline in conformity with the waveform and phase of the corresponding component wave thereby to rotate said mechanical eccentric in synchronism with the wave oscillations of said cam contour as engaged in transit with said follower, the totality of said individual coupling co-operating in polyphase combination with the mutual coupling internal to said polyphase set of mechanical eccentrics at such phase intervals as to eliminate the mechanical disadvantage of any dead center condition and ensure an equable phase-distribution of driving torque whereby said mechanical eccentrics are constrained to rotate smoothly with passage of the composite cam track; said composite cam and cam follower mechanism co-operating as a mechanical coupling with varying transmission ratio by producing rotation of said mechanical eccentrics through one turn per cycle of polyphase wave travel of the composite cam track past the follower mechanism, the number of polyphase wave cycles or wavelengths per unit length of cam track varying along the cam track in conformity with said mathematical law of transmitted motion.

21. In the combination of composite cam and cam follower mechanism as described in claim 20, incorporation of the polyphase set of waves in said composite cam wherein every component wave of said polyphase wave set is borne in mechanical cam contour by the same movable mechanical element, the totality of component wave cam contours co-operating in polyphase unison as a composite multi-curve cam track on a single cam body.

22. In this combination of composite cam and cam follower mechanism as described in claim 20, incorporation of the polyphase set of waves in said composite cam wherein at least one component wave of said polyphase wave set is embodied in mechanical cam contour locally modifying the surface of a movable mechanical element.

23. In the combination of composite cam and cam follower mechanism as described in claim 20, incorporation of the polyphase set of waves in said composite cam wherein at least one component wave of said polyphase wave set is embodied in mechanical cam contour locally modifying the surface of a movable mechanical element so that the transverse wave oscillations of said component wave are disposed at an angle with respect to said surface.

24. In the combination of composite cam and cam follower mechanism as described in claim 20, incorporation of the polyphase set of waves in said composite cam wherein at least one component wave of said polyphase wave set is embodied in mechanical cam contour locally modifying the surface of a movable mechanical element so that the transverse wave oscillations of said component wave are disposed perpendicular to said surface.

25. In the combination of composite cam and cam follower mechanism as described in claim 20, incorporation of the polyphase set of waves in said composite cam wherein at least one component wave of said polyphase wave set is embodied in mechanical cam contour along the length of a movable tape, said movable tape being provided with supporting means and guiding means adapted for connection with the common driving means of said composite cam whereby the train of wave oscillations of said cam contour is constrained to travel lengthwise of said train past a cam follower mechanism.

26. In a calculating device of the class described, in combination, an input shaft, a gear mounted on said input shaft, a tape comprising a length of wire, said wire being divided into unit lengths, said unit lengths being parallel to the longitudinal axis of the tape or inclined thereto in either direction in a predetermined order, loops formed on said tape between said unit lengths, said loops comprising teeth which are adapted to cooperate with the teeth of said gear to drive said tape from said gear, an output shaft having its axis perpendicular to the axis of said input shaft, a gear mounted on said output shaft with the teeth thereof in engagement with said unit lengths of said tape, whereby rotation of the input shaft causes positive movement of the tape and passage of the inclined unit lengths thereof through the teeth of said output shaft gear, said movement causing said output shaft to be rotated an amount and in a direction dependent upon the feed of said tape and the inclination of said unit lengths, said portions of said tape parallel to the longitudinal axis thereof passing between teeth of said output gear without causing rotation thereof.

27. In a calculating machine of the class described, in combination, a tape, means for feeding said tape longitudinally of its axis, said tape being generally rectangular in cross-section and being divided into a plurality of unit lengths, said tape being adapted to be twisted through 180° in either direction at junctures of unit lengths to form a predetermined pattern, a rotatably mounted structure, said structure having a slot therein of a width substantially equal to the thickness of said tape through which said tape passes, an output shaft and means mounted on said cylindrical structure for driving said output shaft in accordance with the rotation of said structure whereby for each movement of said tape through a unit length, said output shaft is rotated through a step of movement in either direction or remains stationary in accordance with the direction of or the absence of twist in said tape and said movement of said output shaft depends upon the predetermined arrangement of said twists in said tape and upon the amount of movement of said input shaft.

28. A device according to claim 27, characterized in that said input shaft carries a gear, said gear having peripherally slotted teeth, which teeth bear against said twisted portions of said tape to positively drive the tape as said gear is rotated.

References Cited in the file of this patent

UNITED STATES PATENTS

| | | |
|---|---|---|
| 1,188,767 | Hebig | June 7, 1916 |
| 1,236,819 | Bulask et al. | Aug. 14, 1917 |

FOREIGN PATENTS

| | | |
|---|---|---|
| 356,492 | Great Britain | Sept. 10, 1931 |